UNITED STATES PATENT OFFICE.

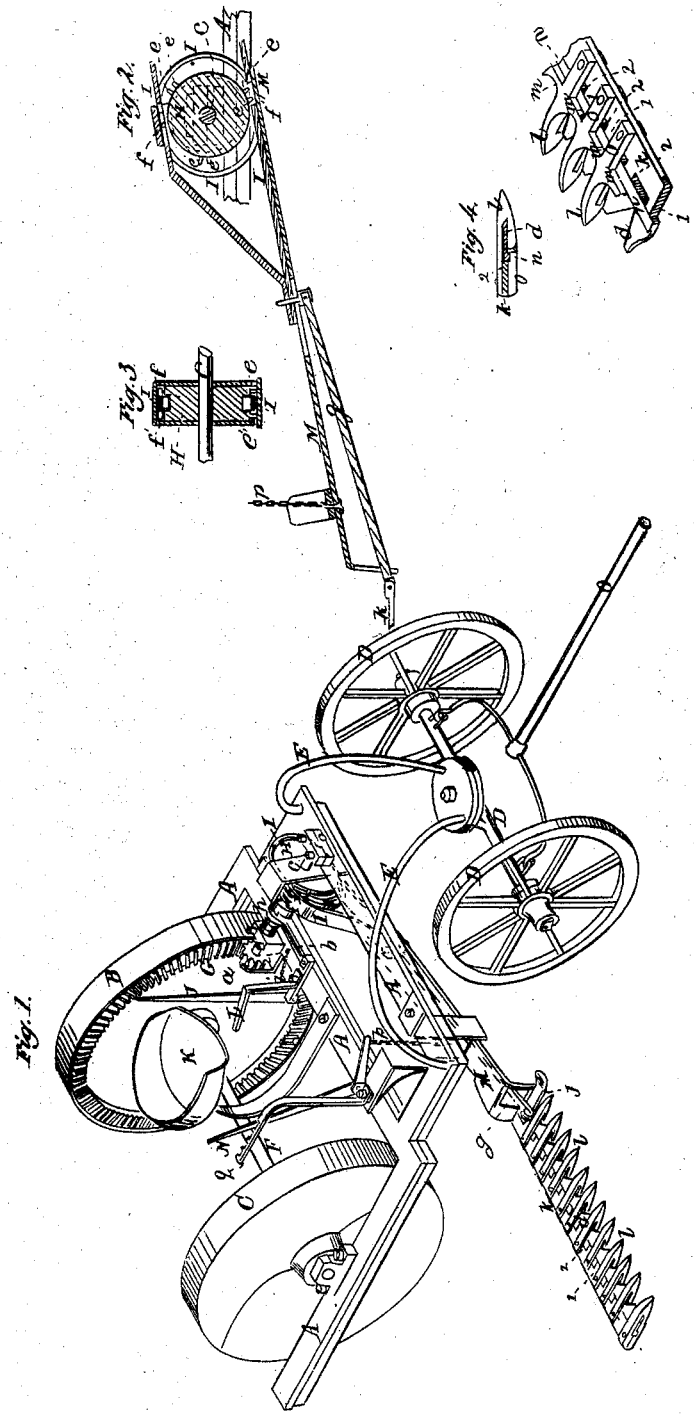

DANIEL SNELL, OF LITTLE FALLS, NEW YORK.

IMPROVEMENT IN HARVESTERS.

Specification forming part of Letters Patent No. 36,034, dated July 29, 1862.

*To all whom it may concern:*

Be it known that I, DANIEL SNELL, of Little Falls, in the county of Herkimer and State of New York, have invented certain new and useful Improvements in Harvesting-Machines; and I do hereby declare that the following is a full, clear, and exact description of the construction and operation of the same, reference being had to the accompanying drawings, making a part of this specification, in which—

Figure 1 represents a perspective view of the machine. Fig. 2 represents a longitudinal vertical section through the apparatus for driving the cutters. Fig. 3 represents a vertical transverse section through the spud-wheel and yoke, by which the cutters receive their vibratory motion. Fig. 4 represents a vertical transverse section through the finger-bar, cutter-bar, and sickle, showing the openings behind the cutter-bar for the escape of all clogging material.

Similar letters of reference, where they occur in the several figures, denote like parts of the machine in all cases.

My invention relates, first, to the mechanism by which I give motion to the cutters; secondly, my invention relates to the manner of constructing the finger-bar and cutting apparatus with a view of preventing as much as possible the short grass from working in under and behind the cutters, and leaving open spaces for that which does work in to pass through or fall out of, all of which will be fully explained in connection with the drawings.

A represents a main frame, partly supported on the wheels B C, and partly on a truck, D, the pieces E E, which connect the main frame with the truck, being arched, so that the wheels of the truck may run under them when the machine is turned short around. The wheel B is fast upon the axle F, and both turn together. The wheel C is connected to the axle by a ratchet and pawl, so that when the machine is drawn forward both wheels B C are drivers, but when backing or turning round the wheel C may turn or stand still independent of the turning of the axle F. On the wheel B there is a cogged rim, G, which, through a pinion, $a$, gives motion to a shaft, $b$, that can be clutched with a shaft, $c$, carrying a spud-wheel, H, which drives the cutters $d$ through a peculiarly-constructed yoke, I, as will be explained.

The wheel H has three sets or pairs of spuds or pins, $e$ $e'$, one pin of each pair a little in advance of the other pin of the pair, and the sets equidistantly arranged around the diameter of the wheel. The yoke I has two sets or pairs of slots, $f f'$, in it, one slot of each pair leading or in advance of its mate or fellow, so that as the pins come around by the rotation of the wheel H they will successively take into the slots in the yoke, the rim-pin of each pair taking its slot just as the front one leaves its slot, and thus the second pin advances the pitman $g$, and the cutters $d$ connected to it, in the same direction that the first one does, giving to the cutters a greater range of vibration or stroke than one pin would do. By this arrangement I not only get up a quick motion for the cutters, but also a long stroke, and that with quite a small wheel. The slots in the yoke I being diametrically opposite each other, or rather on diametrically-opposite sides of the wheel H, each set of pins in making a full circuit give the yoke, and consequently the pitman $g$, which is connected to it, two vibrations, one to the left and one to the right.

$h$ is a spring-clutch, to which a lever, J, is connected by a chain, $i$, or otherwise. This lever extends up to near the driver or conductor in his seat K, and, by means of a catch-piece, L, the lever may be held so as to keep the clutch out of action when necessary. By releasing the lever the spring will throw the clutch into action, and set the cutter in motion.

M is an extension-bar hung at one of its ends to the shaft $c$ of the spud-wheel, so that it may raise and lower on said shaft as a center, and this shaft being also the center of the driving-gear that works the cutters, they may all be turned on their common center without in anywise disturbing their free action. To the opposite or grain-side end of the extension-bar is secured, through the intervention of a shoe, $j$, the finger-bar $k$, which carries the fingers or guards $l$, through which the cutter vibrates.

The front edge of the finger-bar has an alternate series of projections, 1, and an interposed series of openings, 2, upon it, and the rear edge of the cutter-bar and cutters bears against the projections 1, while any short grass or clogging matter may drop through the openings 2. The under side of the guards, as seen in Fig. 4, form a continuous line of support to the cutter or sickle, each guard $l$ having arms or branches $m$, that fill one half of the space between them, the adjacent guard filling the other half, and thus closing the whole space, and these branches are rounded up close to the under side of the sickle, while the cutter-bar $n$ is supported vertically upon the shanks $o$ of the guards. This construction prevents, to a great extent, the short grass, &c., from working in and around the cutter-bar and cutters, and allows that which does work in to drop out through the openings 2.

The extension-bar M is connected to a lever, N, by means of a chain, $p$, or otherwise, and the lever is within reaching distance of the driver or conductor in his seat K, so that by it he may at any time during the working of the machine raise up the finger-bar and cutters to pass any intervening obstacle in their path, and let them down again; or, by pressing the lever N into any of the notches in the catch-bar $q$, the finger-bar and cutters may be held up while transporting the machine from filed to field or from place to place.

Suitable guides for the pitman and for the extension-bar are provided, so that each may freely move in the direction in which they are designed to move, but so that they will be braced in other directions.

I call the bar M an "extension-bar," because it is an extension or continuation of the finger-bar $k$.

O is the tongue for guiding the machine. It is a loose tongue and not sustaining any of the weight of the machine, the truck taking the weight ordinarily allowed to rest on the necks of the team through a stiff tongue.

Having thus fully described the nature and objects of my invention, what I claim therein as new, and desire to secure by Letters Patent, is—

1. The combination of the wheel H and yoke I with their pins and slots for vibrating the cutters, substantially in the manner and for the purpose set forth.

2. In combination with the finger-bar and its alternate projections and openings, the guards $l$, made, as described, with the cutter-bar and cutter resting thereon, in manner and for the purpose set forth.

DANIEL SNELL.

Witnesses:
 PHILO REED,
 VICTOR ADAMS.